(12) United States Patent
Nishiyama

(10) Patent No.: US 9,983,296 B2
(45) Date of Patent: May 29, 2018

(54) DATA PROCESSING APPARATUS, RADAR APPARATUS, AND DATA PROCESSING METHOD

(71) Applicant: FURUNO ELECTRIC CO., LTD., Nishinomiya, Hyogo (JP)

(72) Inventor: Koji Nishiyama, Nishinomiya (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 834 days.

(21) Appl. No.: 14/382,692

(22) PCT Filed: Feb. 18, 2013

(86) PCT No.: PCT/JP2013/053887
§ 371 (c)(1),
(2) Date: Sep. 3, 2014

(87) PCT Pub. No.: WO2013/133000
PCT Pub. Date: Sep. 12, 2013

(65) Prior Publication Data
US 2015/0022393 A1 Jan. 22, 2015

(30) Foreign Application Priority Data
Mar. 9, 2012 (JP) .................................. 2012-052812

(51) Int. Cl.
*G01S 7/295* (2006.01)
*G01S 7/12* (2006.01)
(Continued)

(52) U.S. Cl.
CPC .............. *G01S 7/295* (2013.01); *G01S 7/02* (2013.01); *G01S 7/04* (2013.01); *G01S 7/064* (2013.01);
(Continued)

(58) Field of Classification Search
CPC ... G01S 7/02; G01S 13/89; G01S 7/04; G01S 7/064; G01S 7/12; G01S 7/295; G01S 13/282; G01S 13/9307; G01S 13/426
See application file for complete search history.

(56) References Cited

U.S. PATENT DOCUMENTS 6,140,955 A 10/2000 Andrusiak et al.
6,597,307 B2 * 7/2003 Nakanishi ............... G01S 7/412
342/107

(Continued)

FOREIGN PATENT DOCUMENTS

JP 07-020060 A 1/1995
JP 2000-030052 A 1/2000
(Continued)

OTHER PUBLICATIONS

International Search Report of the corresponding International Application No. PCT/JP2013/053887, dated May 21, 2013.

*Primary Examiner* — Matthew M Barker
(74) *Attorney, Agent, or Firm* — Studebaker & Brackett PC

(57) ABSTRACT

A data processing apparatus that can set the magnification factor according to the distance from the antenna is provided so that the display of objects close to the antenna is easier to see and with which the changes in the settings of the magnification factor is easy. The buffer memory stores the digital signals converted by the A/D converter in association with the distance and azimuth with respect to the antenna. The digital filter filters the digital signals read from the buffer memory. A digital filter is provided that converts a value of data of interest, of digital data stored in the memory, to a value based on values of the data of interest to be processed and peripheral data in a periphery of the data of interest, and the digital filter changes a range of the periph- (Continued)

eral data used for a filter processing according to the distance from the antenna to the data of interest.

18 Claims, 8 Drawing Sheets

(51) Int. Cl.
- *G01S 7/06* (2006.01)
- *G01S 7/02* (2006.01)
- *G01S 7/04* (2006.01)
- *G01S 13/89* (2006.01)
- G01S 13/28 (2006.01)
- G01S 13/42 (2006.01)
- G01S 13/93 (2006.01)

(52) U.S. Cl.
CPC ............... *G01S 7/12* (2013.01); *G01S 13/89* (2013.01); *G01S 13/282* (2013.01); *G01S 13/426* (2013.01); *G01S 13/9307* (2013.01)

(56) References Cited

U.S. PATENT DOCUMENTS

| | | |
|---|---|---|
| 2008/0013789 A1 | 1/2008 | Shima et al. |
| 2010/0289690 A1 | 11/2010 | Dai |

FOREIGN PATENT DOCUMENTS

| | | |
|---|---|---|
| JP | 2003-315439 A | 11/2003 |
| JP | 2005-147834 A | 6/2005 |
| JP | 2005-346665 A | 12/2005 |
| JP | 2006-340399 A | 12/2006 |
| JP | 2008-021196 A | 1/2008 |
| JP | 4413585 B2 | 2/2010 |
| JP | 2010-266292 A | 11/2010 |
| WO | 2010-130285 A1 | 11/2010 |

* cited by examiner

DATA PROCESSING APPARATUS, RADAR APPARATUS, AND DATA PROCESSING METHOD

CROSS REFERENCE TO RELATED APPLICATIONS

This application is a U.S. National stage of International Application No. PCT/JP2013/053887 filed on Feb. 18, 2013. This application claims priority to Japanese Patent Application No. 2012-052812 filed on Mar. 9, 2012. The entire disclosure of Japanese Patent Application No. 2012-052812 is hereby incorporated herein by reference.

BACKGROUND

Field of the Invention

The present invention relates to a radar apparatus that displays objects around an antenna captured by radio waves that are transmitted and received by the antenna, along with a data processing apparatus and a data processing method used with the radar apparatus.

Background Information

In a radar apparatus, in general, an object (ships at sea, buoys, terrain and structures on land, etc.) is detected by capturing the reflected radio waves that are emitted, and the detected object is displayed on a display. For this reason, the antenna transmits a beam of pulsed radio waves (a radar transmission signal) having a sharp directivity; at the same time, the antenna receives the reflected waves from objects that are in the periphery. The transmission beam that is transmitted from the antenna has a prescribed beam width. The antenna rotates on a horizontal plane and repeats the transmission and reception. In this way, in a radar apparatus that is mounted on a ship, when the antenna rotates and changes the azimuth to and from which radio waves are transmitted and received to capture objects in the periphery, since the beam width has an angle, when trying to display a ship that is sailing at a relative distance with an appropriate resolution, the display of small yachts and boats that are relatively near becomes small and difficult to see.

Therefore, for example, Patent Literature 1 (Japanese Patent No. 4,413,585) discloses a technology that enlarges the images that are close to the antenna while inhibiting the resolution of the images that are far from the antenna from decreasing by enlarging the sensed image data detected by the radar apparatus in the two-dimensional direction.

SUMMARY

The technology disclosed in Patent Literature 1 is advantageous in that this technology can process data at a high speed, making the high-speed display corresponding to the behavior of the radar apparatus possible. However, since the procedure for enlargement in the two-dimensional direction is complex, changing the magnification factor is relatively difficult.

The object of the present invention is to provide a data processing apparatus, a radar apparatus, and a data processing method that can change the magnification factor according to the distance from the antenna and with which changing the settings for the magnification factor is easy.

A data processing apparatus for solving the above-described problem is a data processing apparatus configured to generate image data for displaying a situation in a periphery of an antenna from digital data that is generated based on echo signal received via an antenna, the data processing apparatus comprises a memory configured to store the digital data in association with distance and azimuth from the antenna, and a digital filter configured to convert a value of data of interest to be processed, of the digital data stored in the memory, to a value based on values of the data of interest and peripheral data in a periphery of the data of interest, the digital filter being further configured to change a range of the peripheral data used for a filter processing according to the distance from the antenna associated with the data of interest.

According to this data processing apparatus, since the digital filter changes the range of the peripheral data that is used for the filter processing according to the distance from the antenna to the data of interest, the range of the peripheral data that affects the value of the data of interest changes according to the distance. With this widening the range of the peripheral data so that the data of interest is more easily affected by the peripheral data or, conversely, narrowing the range of the peripheral data so that the data of interest is less easily affected by the peripheral data is possible. By changing the size of the influence of the peripheral data, the magnification factor of the digital filter can be changed according to the distance from the antenna.

The data processing method for solving the above-described problem is a data processing method configured to generate image data for displaying a situation in a periphery of an antenna from digital data that is generated based on echo signal received via the antenna, the data processing method comprises storing the digital data in association with distance and azimuth from the antenna, and conducting a digital filter processing that converts a value of data of interest, of the digital data stored, to a value based on values of the data of interest to be processed and peripheral data in a periphery of the data of interest, a range of the peripheral data used for the digital filter processing being changed according to the distance from the antenna in association with the data of interest.

According to this data processing method, since in the digital filter processing, the range of the peripheral data used for the digital filter processing according to the distance from the antenna to the data of interest is changed, the range of the peripheral data that affect the value of the data of interest changes according to the distance. With this, widening the range of the peripheral data in the digital filter processing so that the data of interest is more easily affected by the peripheral data or, conversely, narrowing the range of the peripheral data so that the data of interest is less easily affected by the peripheral data is possible. By changing the size of the influence of the peripheral data, the magnification factor of the images by the digital filter processing can be changed according to the distance from the antenna.

According to the present invention, magnification can be done according to the distance from the antenna, and setting the change of the magnification factor becomes easy.

DETAILED DESCRIPTION OF EMBODIMENTS

First Embodiment

Configuration of the Radar Apparatus

Figure 1:
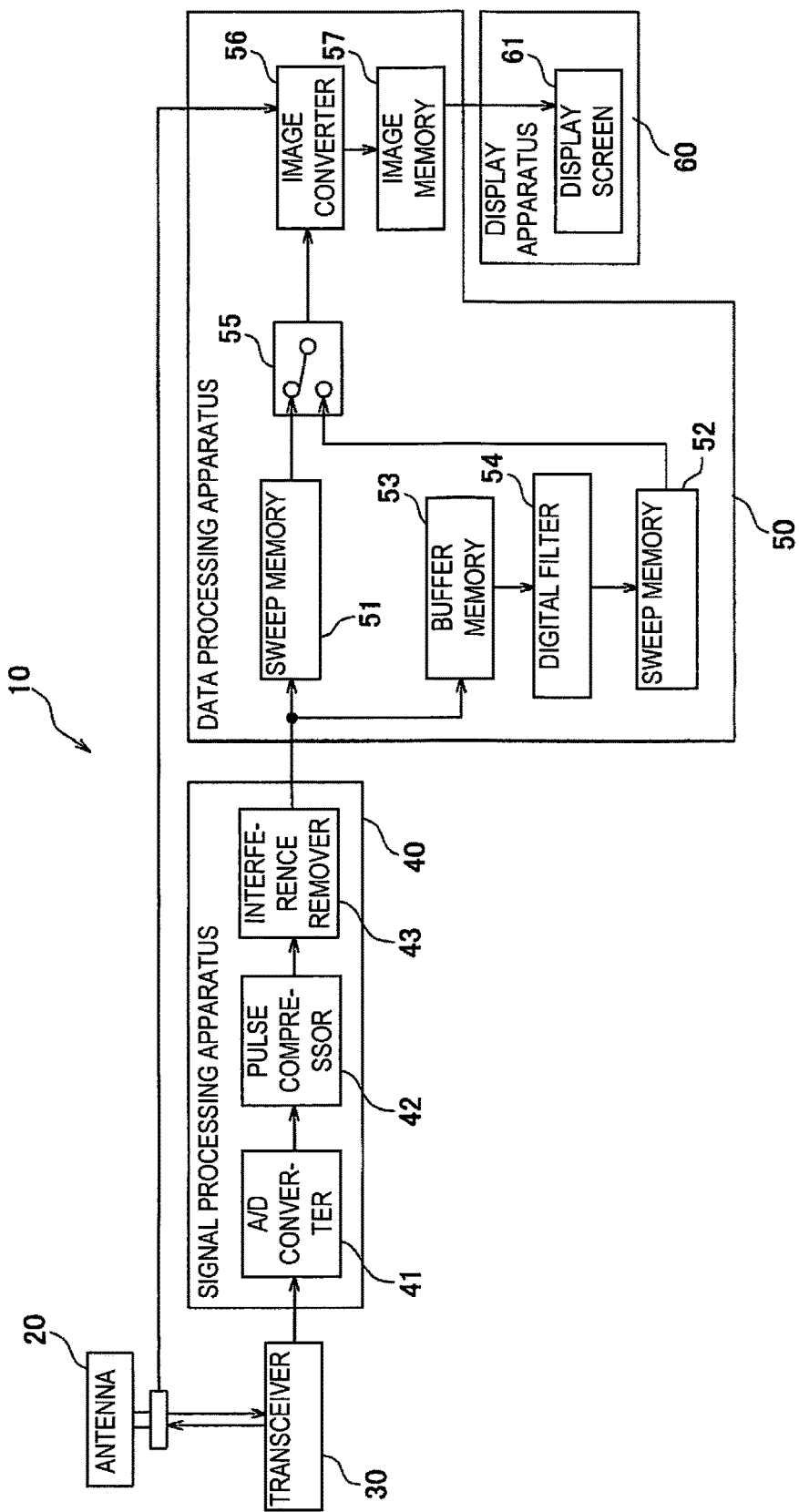
FIG. 1 is a block diagram showing a schematic configuration of the radar apparatus according to the first embodiment of the present invention.

The radar apparatus according to the first embodiment of the present invention will be explained below using the drawings. FIG. 1 is a block diagram showing a schematic configuration of this radar apparatus. The radar apparatus 10 shown in FIG. 1 comprises an antenna 20, a transceiver 30, a signal processing apparatus 40, a data processing apparatus 50, and a display apparatus 60. Additionally, the data processing apparatus 50 comprises sweep memories 51 and 52, a buffer memory 53, a digital filter 54, a selector 55, an image converter 56, and an image memory 57.

In FIG. 1, the configuration in which the selector 55 is selecting the sweep memory 51, that is, a configuration comprising the antenna 20, the transceiver 30, the signal processing apparatus 40, the sweep memory 51, the selector 55, the image converter 56, image memory 57, and the display apparatus 60, is the same configuration as that in a conventional radar apparatus. Also, in FIG. 1, the configuration in which the selector 55 is selecting the sweep memory 52, that is, a configuration comprising the antenna 20, the transceiver 30, the signal processing apparatus 40, the buffer memory 53, the digital filter 54, the sweep memory 52, the selector 55, the image converter 56, image memory 57, and the display apparatus 60, is the configuration to realize the newly added function.

Antenna

In this radar apparatus 10, the antenna 20 transmits a beam of pulsed radio waves (a radar transmission signal) having a sharp directivity; at the same time the antenna receives the reflected waves from objects that are in the periphery. The beam width is set to, for example, 2 degrees. The antenna 20 rotates on a horizontal plane and repeats the transmission and reception. The rotational speed is, for example, 24 rpm. The unit of processing conducted while the antenna 20 makes one rotation is called one scan. Additionally, the operation of the transmission and reception during the period between when the radar transmission signal is transmitted and immediately prior to when the next radar transmission signal is transmitted is called a sweep. The time of one sweep, that is, the transmission cycle, is, for example, 1 ms. Additionally, the amount of received data per one sweep is the number of sampling points.

In the antenna 20, a radar reception signal including the reflected waves from the object (an object signal) is received by emitting the radar transmission signal concentrated in a certain direction. The radar reception signal can include, besides the object signal components, components such as clutter, interference waves from other radar apparatuses, and receiver noise.

The distance from the radar apparatus 10 to the object can be calculated from the time difference between the reception time of the radar reception signal, including the object signal, and the transmission time of the radar transmission signal corresponding to the radar reception signal. Additionally, the azimuth of the object can be calculated from the rotation angle of the antenna 20 when receiving the corresponding radar transmission signal.

Transceiver

The transceiver 30 generates a radar transmission signal and sends the signal to the antenna 20; then, the transceiver takes in the radar reception signal from the antenna 20 and outputs this signal to an A/D converter 41. Therefore, the transceiver 30 generates a radar transmission signal with an intermediate frequency at the same time interval or at a different time interval. The radar transmission signal is, for example, a frequency modulated signal known as a chirp signal. The transceiver 30 conducts frequency conversion by mixing the radar transmission signal with an intermediate frequency with local signals, and outputs this to the antenna 20 via a duplexer (which has been omitted in the diagram).

The transceiver 30 takes in the radar reception signal that is output from the antenna 20 via a duplexer, etc. Then, the transceiver mixes the radar reception signal with the local signals, converts them to an intermediate frequency, and outputs this to an A/D converter 41 in the subsequent step.

Signal Processing Apparatus

Signal processing, such as pulse compression processing with respect to the above-described chirp signal, and interference removal that removes the interference waves included in the radar reception signal, are carried out in the signal processing apparatus 40. The signal processing apparatus 40 comprises an A/D converter 41 in order to conduct this kind of signal processing with digital signals.

The A/D converter 41 converts the radar reception signals, which are output from the transceiver 30 and are then converted to intermediate frequencies (analog signals), to digital signals. Here, as a representative signal processing, a case in which the signal processing apparatus 40 conducts pulse compression processing and interference removal will be explained. The digital signal converted in the A/D converter 41 is pulse compression processed in the pulse compressor 42. For this reason, the pulse compressor 42 comprises, for example, a transversal filter, etc. The digital signal that is pulse compressed is input into an interference remover 43, thereby removing the interference waves. Here, a case in which pulse compression processing and interference removal are conducted as signal processing is shown; however, signal processing is not limited to this and may involve other steps as well.

Data Processing Apparatus

The data processing apparatus 50 processes digital data that are signal processed in the signal processing apparatus 40. There are various steps of data processing in the radar apparatus 10, such as CFAR (Constant False Alarm Rate) processing; however, here, the processing according to the present invention will be described. Thus, the data processing recited here and other data processing such as CFAR can be carried out together, and the configuration of this data processing apparatus 50 is not limited to the configuration that is explained below.

The data processing apparatus 50 comprises two sweep memories 51 and 52. These sweep memories 51 and 52 are storage apparatuses that store digital signals of the radar reception signal per each azimuth (per each sweep). In the explanation below, the digital signal for each azimuth that is stored in these sweep memories 51 and 52 is called sweep data. The sweep data are data that are stored in sequence according to the distance from the antenna 20. The sweep memory 51 applies information regarding the azimuth and distance with respect to the antenna 20 to the sweep data by storing the sweep data for each azimuth in sequence from the closest one.

Figure 2:
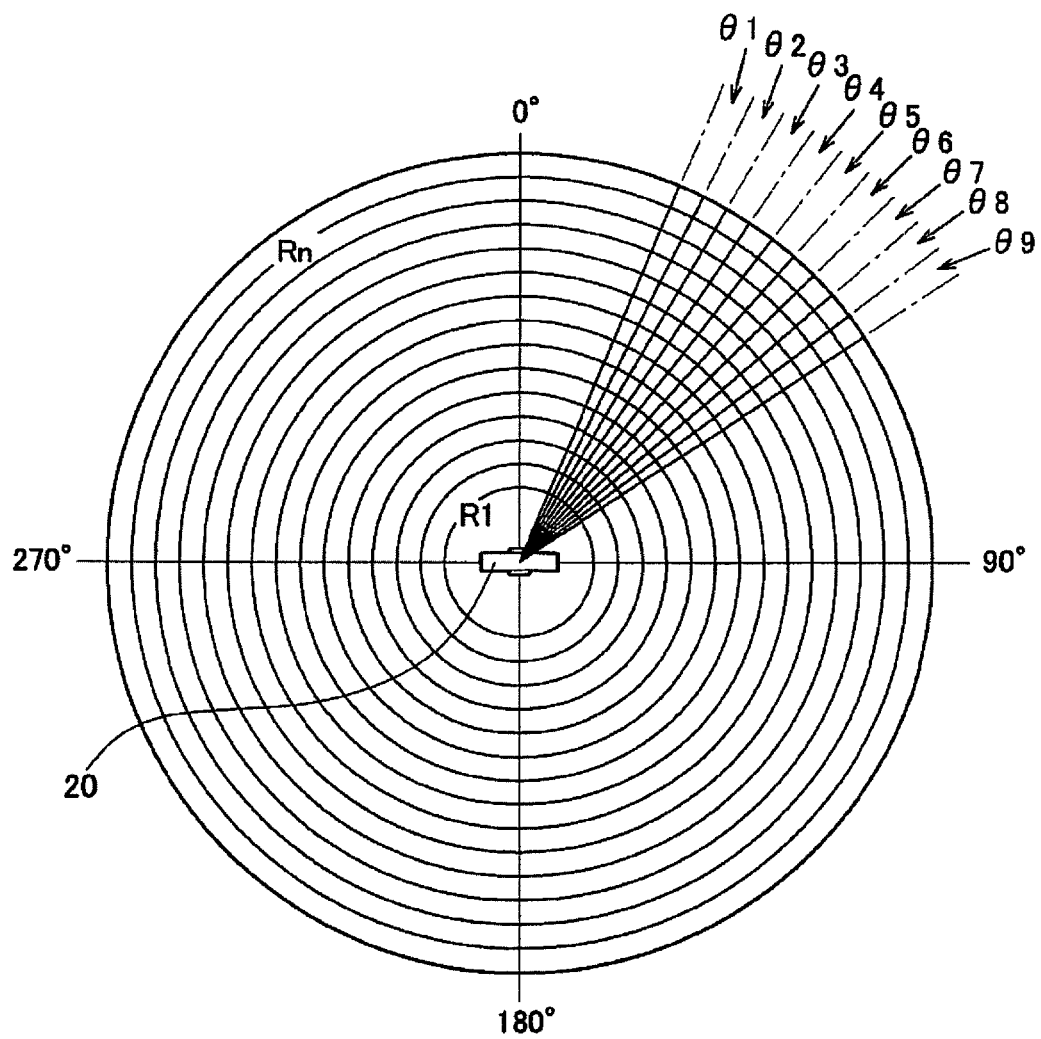
FIG. 2 is a conceptual diagram depicting the relationship between the antenna and the sweep data.

FIG. 2 is a schematic diagram showing the relationship between the antenna 20 and the sweep data. The sweep data $\theta 1$ include data from distance R1-Rn, relating to an azimuth $\theta 1$ that forms an angle of $\theta 1$ degrees with a 0-degree azimuth, with respect to the antenna 20. In the same way, the sweep data $\theta 2$-$\theta 9$ each includes data from the distance R1-Rn relating to azimuths $\theta 2$-$\theta 9$. As mentioned above, the antenna 20 rotates; therefore, when transmitting and receiving sweep data S2 in the $\theta 1$ azimuth, the antenna will face a direction that has an angle of $\theta 1$ degrees with respect to the direction that is perpendicular to the longitudinal direction of the antenna 20; however, but in FIG. 2, the relationship between the antenna and the azimuth is ignored in order to simplify the drawing. Additionally, the numerous sweep data are generated from the radar reception signal obtained from 360 degrees around the antenna 20 besides the sweep data $\theta 1$-$\theta 9$; however, their depictions have been omitted in FIG. 2. There are also many cases in which the radar apparatus 10 is loaded on movable bodies, such as ships, vehicles, and aircraft; in the case that the radar apparatus 10 is moving along with those movable bodies, correcting for the azimuth and distance accompanying the movement becomes necessary, but an explanation for the correction of the radar reception signal has been omitted; the following explanation has been provided assuming that the sweep data corresponding to the azimuth and distance after correction have been omitted from the signal processing apparatus 40.

Sweep data for at least one sweep, for example, two sweeps, are constantly stored in the sweep memories 51 and 52 in order to obtain the time required for processing until the sweep data are stored in the image memory 57 in the subsequent step. When conducting the same conventional operation, the sweep memory 51 is selected in the selector 55.

Meanwhile, when the sweep memory 52 is selected in the selector 55, the data processing of the sweep data is conducted in order to be a magnification factor corresponding to the distance from the antenna 20. This kind of data processing is carried out using the buffer memory 53 and the digital filter 54. This data processing will be explained in detail below.

The data processing apparatus 50 further comprises an image converter 56 that receives the sweep data that are output from the selector 55, as well as an image memory 57 that stores the image data that are converted and generated by the image converter 56. In the image converter 56, the signals regarding the rotation angle are received from the antenna 20, and an affine transformation is conducted and is converted from polar coordinates expressed by the distance R and the azimuth $\theta$ to X-Y coordinates corresponding to the display screen 61. The image data stored in the image memory 57 are stored corresponding to the vertical and horizontal of the display screen 61 of the display apparatus 60 mentioned below.

Display Apparatus

The display apparatus 60 comprises a display screen 61 such as an LCD (Liquid Crystal Display) that displays images based on the image data that are stored in the image memory 57 of the data processing apparatus 50. The image data stored in the image memory 57 are stored corresponding to the vertical and horizontal aspects of the display screen 61, so that, if the data read out in sequence from the image memory 57 are arranged vertically and horizontally matching the pixels of the display screen 61 and are displayed, an image such as that shown in FIG. 3 will be obtained. The pixel count of the display screen 61 is, for example, 640×480 dots.

Figure 3:
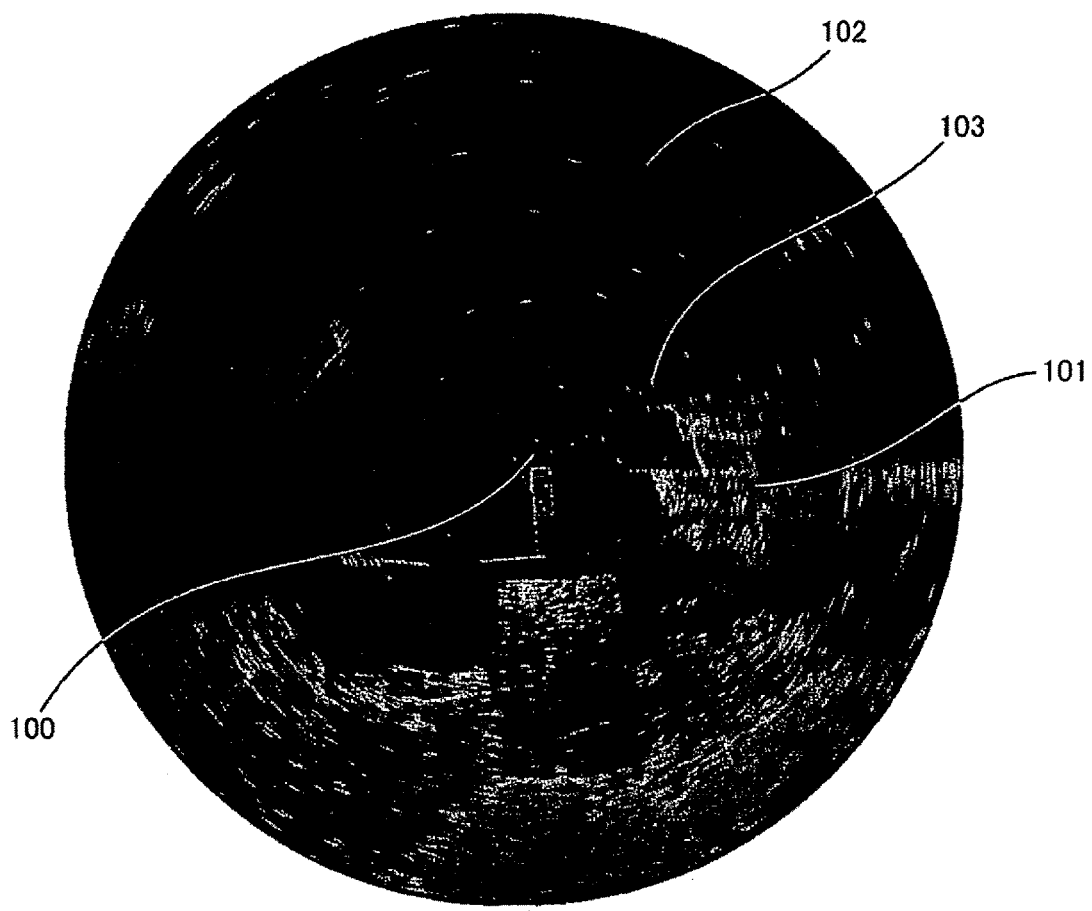
FIG. 3 is a diagram showing one example of an image before the filter processing that is displayed on a display screen.

In FIG. 3, the lower region 101 with a relatively large area and a high degree of brightness (bright) is the land, and the upper region 102 with a relatively large area and a low degree of brightness (dark) is the sea; the small lumps 103 with high degree of brightness here and there are objects such as boats. As can be seen in FIG. 3, the resolution near the center 100 is high, and the resolution away from the center 100 is low. This is because, for example, the data count of one scan from a distance R1, and the data count of one scan from a distance Rn shown in FIG. 2 are the same; therefore, the range that one piece of data shows for somewhere close, such as distance R1, is narrow while the range indicated by one piece of data for somewhere further, such as distance Rn, becomes wide.

Behavior of the Data Processing Apparatus

Data processing in the case that the output of sweep memory 52 is selected by the selector 55 will be explained. The digital filter 54 filters the sweep data that are read from the buffer memory 53. The settings for this filtering are changed according to the length of the distance R1-Rn.

Figure 4A:
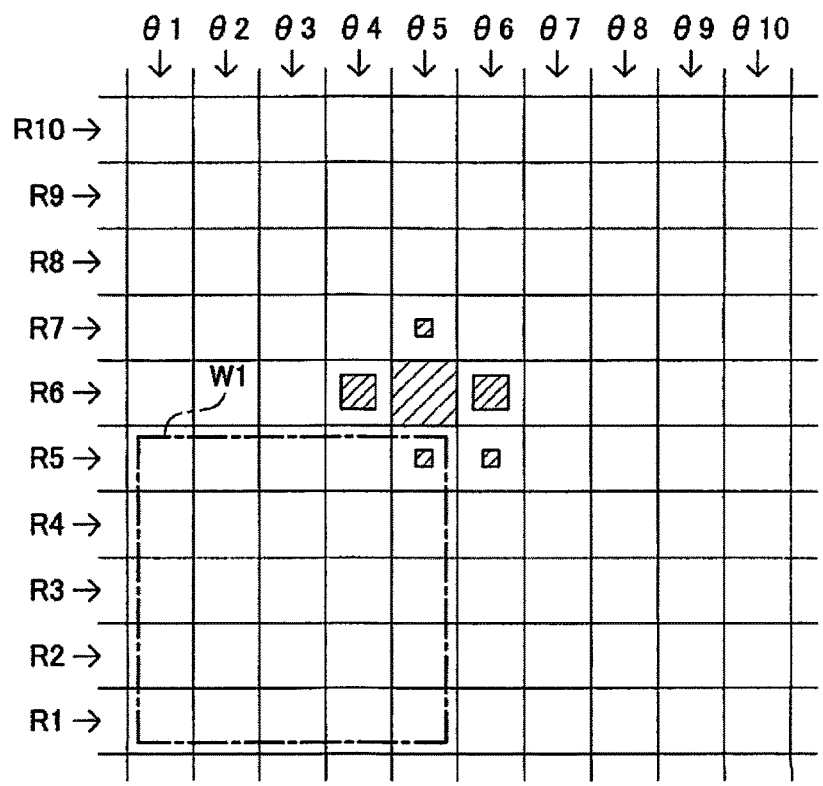
FIG. 4A is a conceptual diagram depicting the situation in which data are close to the antenna before data processing.
Figure 4B:
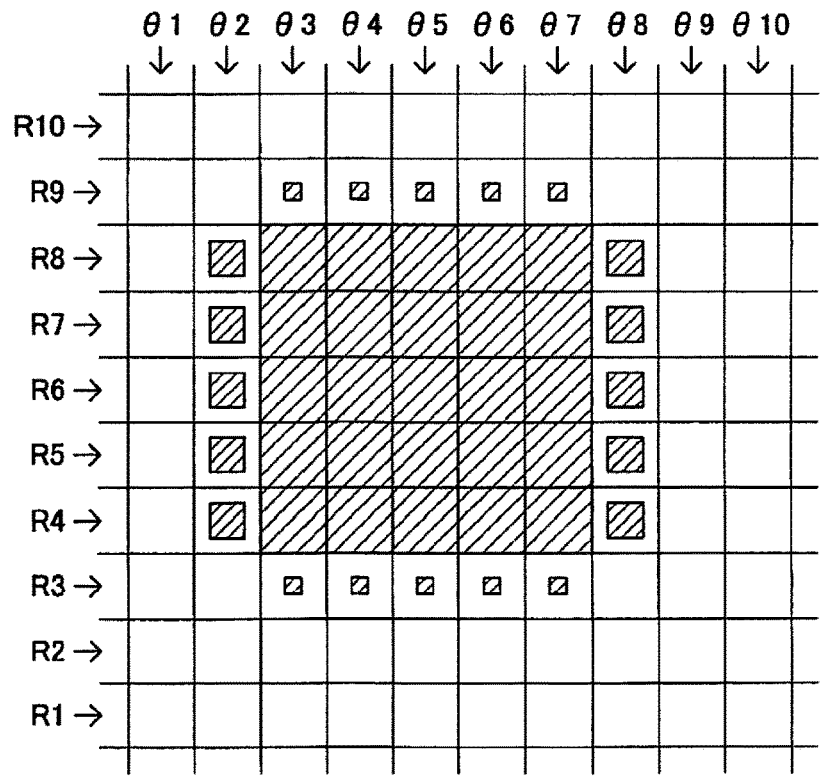
FIG. 4B is a conceptual diagram depicting the situation of data corresponding to FIG. 4A after data processing.
Figure 5A:
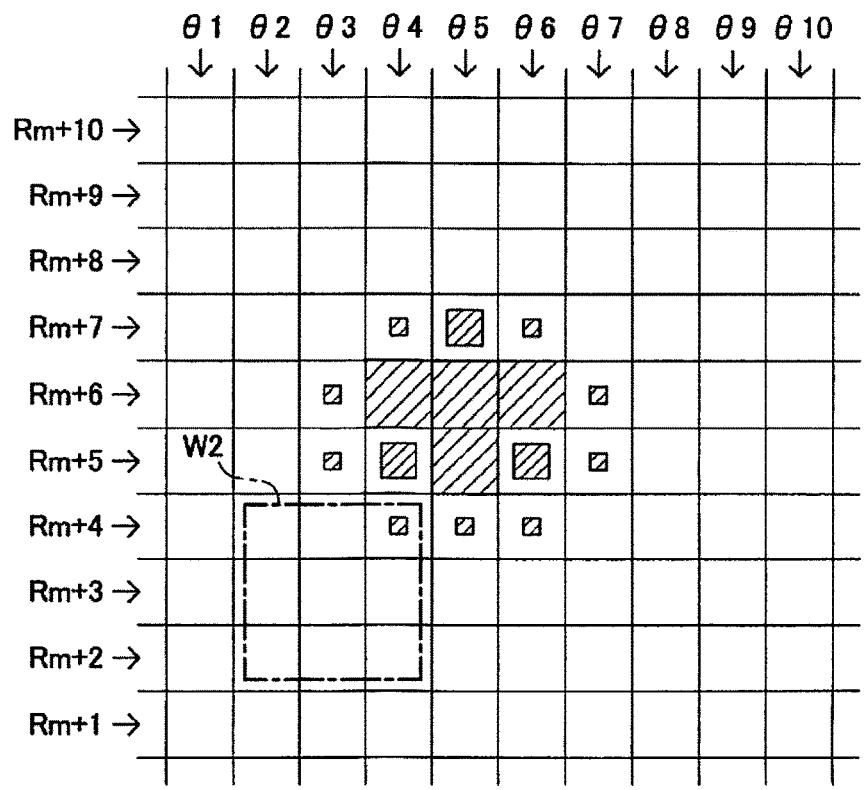
FIG. 5A is a conceptual diagram depicting the situation in which data are far from the antenna before data processing.
Figure 5B:
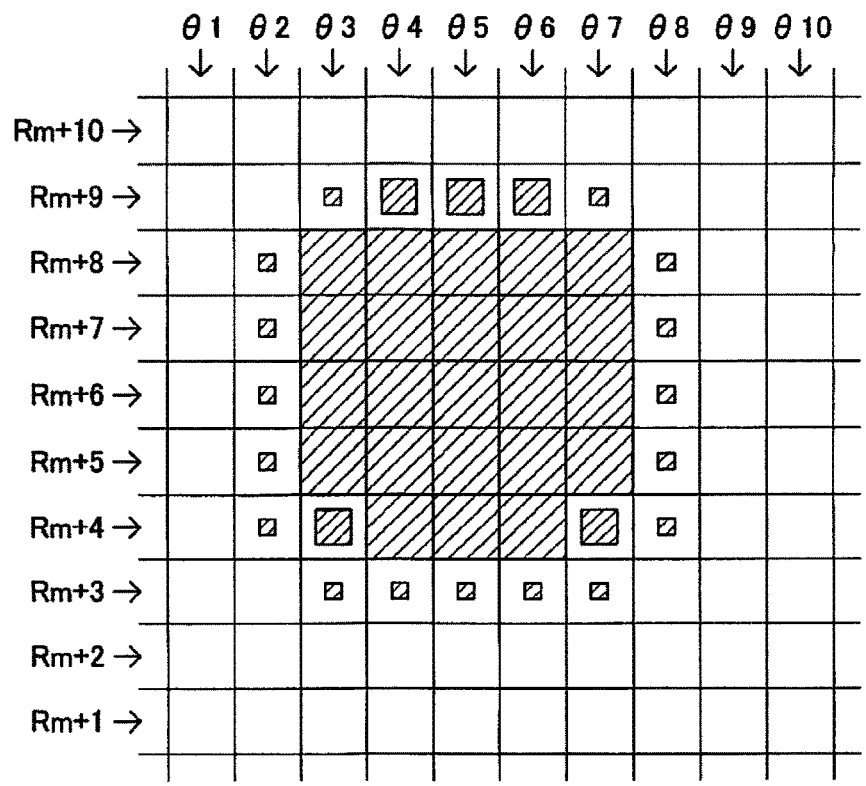
FIG. 5B is a conceptual diagram depicting the situation of data corresponding to FIG. 5A after data processing.

Data processing according to the digital filter 54 will be explained using FIG. 4 and FIG. 5. FIG. 4 is a diagram depicting the data processing of the region relatively close to the antenna 20, with the situation of the data before data processing shown in FIG. 4A and the situation of the data after data processing shown in FIG. 4B. Additionally, FIG. 5 is a diagram depicting the data processing of the region slightly distanced from the antenna 20 as compared to FIG. 4, with the situation of the data before data processing shown in FIG. 5A and the situation of the data after data processing shown in FIG. 5B. Regarding each data point in FIG. 4 and FIG. 5, the display is such that the larger the data value, the larger the area indicated by the oblique lines, i.e., the display is such that the reflected waves from objects, etc., are present in the region indicated by the oblique lines. Additionally, here, the data values without oblique lines are considered to be 0 to simplify the explanation; however, in actuality, the data values need only to be values close to 0, for example.

As shown in FIG. 4, regarding the distances R1-R10 that are relatively close to the antenna 20, the digital filter 54 conducts the filter processing using a 5×5 window W1. On the other hand, as shown in FIG. 5, regarding the distances Rm+1-Rm+10 that are slightly distanced from the antenna 20, the digital filter 54 conducts the filter processing using a 3×3 window W2. Here, m is an integer larger than 10.

The digital filter 54 is a type of FIR (finite impulse response) filter that replaces the data values in the center of the windows W1 and W2 with the maximum values in the data in the windows W1 and W2. For example, in the state shown in FIG. 4A, window W1 covers the data between $\theta 1$-$\theta 5$ in the azimuth direction and between R1-R5 in the distance direction. In this state, the highest values in the data covered by window W1 are data from the azimuth $\theta 5$ and the distance R5. Therefore, the data values from the azimuth $\theta 3$ and the distance R3 in the center of the window W1 will be replaced with the values from the azimuth $\theta 5$ and the distance R5. The filter processing that is the same as the above-described filter processing is conducted while shifting the window W1 one by one in the distance direction so that all of the sweep data in one azimuth will become the center data at least once. Thereafter, the window W1 is shifted one by one in the azimuth direction; in the same way as above, the filter processing that is the same as the above-described filter processing is conducted while shifting the window W1 one by one in the distance direction so that all of the sweep data in one azimuth will become the center at least once. If this kind of filter processing is conducted on the data in FIG. 4A, the data range showing the object will expand, as shown in FIG. 4B.

If the distance is far from the antenna 20, as shown in FIG. 5, window W2 will be used for the filter processing. Since the size of window W2 shown in FIG. 5A is 3×3, in the state shown in FIG. 5A, the highest values in the data covered by window W2 are the data from azimuth $\theta 4$ and the distance Rm+4. For this reason, the data values from the azimuth $\theta 3$ and the distance Rm+3 in the center of the window W2 will be replaced by the values from the azimuth $\theta 4$ and the distance Rm+4. The filter processing is conducted on the sweep data in FIG. 5A, as well by the digital filter 54 using window W2, and the data shown in FIG. 5B are obtained. When comparing FIG. 5 with FIG. 4, the number of data before processing by the digital filter 54 and whose value is not zero is greater in FIG. 5A, and the number of data after processing by the digital filter 54 and whose value is not zero is greater in FIG. 4B.

In order to conduct processing with this kind of digital filter 54, for example, if the size of the largest window of the digital filter 54 is u×u, the sweep data for u number of azimuths will become necessary. If the sweep memories 51 and 52 are increased, this causes an increase in the cost of the radar apparatus 10; therefore, conventionally, as mentioned above, the sweep data stored by the sweep memories 51 and 52 are usually around 1-3 sweeps. Therefore, in order to expand the number of sweeps that can be stored, a buffer memory 53 is provided.

Therefore, basically, the buffer memory 53 has the same configuration as the sweep memories 51 and 52; however, the buffer memory 53 has increased the memory capacity as compared to the sweep memories 51 and 52, and the number of sweeps that can be stored has been increased.

Figure 6:
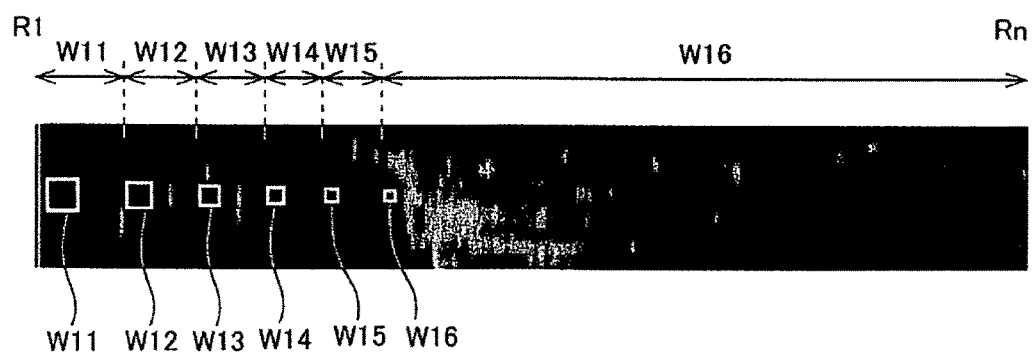
FIG. 6 is a conceptual diagram depicting one application method of a window of the digital filter.

In the explanation above, a case was explained in which the digital filter 54 changes between two types of windows, W1 and W2, according to the distance; however, many more numbers of windows can also be used, such as the six types of windows, W11, W12, W13, W14, W15, and W16, as shown in FIG. 6. In this case, the sizes of the windows satisfy W1>W12>W13>W14>W15>W16. For example, window W16 has a size of 3×3, window W15 has a size of 5×5, window W14 has a size of 7×7, window W13 has a size or 9×9, window W12 has a size of 11×11, and window 11 has a size of 13×13. The ranges in which the six types of windows are used are the ranges indicated by the arrows between the distances R1 and Rn having the same reference symbols as the windows. The pixel count of the display screen 61 is, as mentioned above, 640×480 dots; for the sample numbers in the distance direction and the number of sweeps for one scan, they can, for example, go up to the several thousands, so that the window sizes can be set as described above. Additionally, regarding the pixel count of the display screen 61, since the number of samples for one scan will increase, the samples will be displayed after thinning the data. Here, in order to suppress the calculation time and memory capacity, the sweep data are data provided after they have been thinned. However, the digital filter 54 can be made to conduct the above-described filter processing using the data prior to thinning.

Characteristics (1) If the configuration is such that the transmission beam is repeatedly emitted while changing the azimuth with the antenna 20 as the center, and the reflected echo by that transmission beam is received by the same antenna 20, the reflected echo from the objects will have a lower resolution the farther they are. In other words, the objects that are close by will have a high resolution, so that they will be displayed small on the display screen 61, making them difficult to see.

For this reason, if enlarging objects close to the antenna 20 is desired for easier visibility, the sweep memory 52 is selected by the selector 55. The buffer memory 53 (the memory of claim 1) stores the sweep data (the digital data) converted by the A/D converter 41 in relation to the distance and the azimuth with respect to the antenna 20. The digital filter 54 changes the sizes of the windows W1 and W2 (the range of the peripheral data) according to the distance from the antenna 20.

For example, if the digital filter 54 shown in FIG. 4A uses a large window W2 (if the range of the peripheral data is expanded), the values of the data (the data of interest) in the center (R3, $\theta 3$) of window W1 will be replaced with the maximum values out of the values of 25 pieces of data (the peripheral data) of window W1 (R1-R5, $\theta 1$-$\theta 5$). On the other hand, if the digital filter 54 shown in FIG. 5A uses a small window W2 (if the range of the peripheral data is narrowed), the values of the data (the data of interest) in the center (R3, $\theta 3$) of window W1 will be replaced with the maximum values out of the values of 9 pieces of data (the peripheral data) of window W2 (R2-R4, $\theta 2$-$\theta 4$). As a result, as can be seen by comparing FIG. 4B and FIG. 5B, the setting can be such that, by using window W1, i.e., expanding the range of the peripheral data, so that the data in the center of the window W1 (the data of interest) become more susceptible to the effects of the peripheral data, the magnification factor of the digital filter 54 will become larger as compared to a case in which window W2 is used, i.e., narrowing the range of the peripheral data, so that the data in the center of the window W2 (the data of interest) become less susceptible to the effects of the peripheral data. By changing the sizes of the windows as with these windows W1 and W2 according to the distances R1-Rn, i.e., changing the ranges of the peripheral data used for the filter processing according to the distances from the antenna in relation to the data of interest, the display magnification factor can be changed according to the distance from the antenna 20.

(2) The digital filter 54 converts the data values in the center to the maximum data values in the windows W1 and W2 when the maximum values in the windows W1 and W2 (the maximum strength of the echo signals indicated by the peripheral data) are greater than the data values in the center of the windows W1 and W2 (the strength of the echo signals indicated by the data of interest). With this, the data in the center of the windows W1 and W2 will become large, i.e., the strength of the echo signals indicated by the data of interest will increase. As a result, the images of the objects close to the location of the antenna 20 are more easily enlarged, and the images far from the location of the antenna 20 are not easily enlarged; the magnification factor for those that are closer to the location of the antenna 20 can be made larger as compared to those that are far away.

Meanwhile, in the above-described first embodiment, the sweep data are shown as an example of the digital data, but the digital data are not limited to the above-described sweep data; they can be any data that are generated in the course of obtaining image data from the echo signals. Additionally, in the above-described first embodiment, the image data in an X-Y coordinate system are given as an example of the image data displayed on the display screen 61 in the explanation; however, the image data need only to be appropriate for the display screen 61 and the display method, and they are not limited to data in an X-Y coordinate system.

(3) The digital filter 54 can be described as being an FIR filter having a characteristic to change the data values in the center to values larger than a prescribed value when there are values that are larger than the prescribed value in the peripheral data in the periphery of the data in the center in the case that the values of the data in the centers of windows W1 and W2 (the data of interest) are less than or equal to the prescribed values.

In particular, this digital filter 54 is a maximum value filter that replaces the values of the data in the centers of windows W1 and W2 (the data of interest) with the maximum values of the values of the peripheral data in the periphery of the data in the centers.

Additionally, the digital filter 54 increases the size of the window W1 that corresponds to a distance from the antenna 20 that is farther away than a prescribed distance, so that this window becomes larger than the size of the window W2 that corresponds to a distance closer than the prescribed distance. In the above-described embodiment, the windows W1 and W2 have the same numbers of data in the distance direction and the azimuth direction and are shown to be square-shaped in FIG. 4A and FIG. 5A; however, these numbers do not have to be the same; for example, the windows can be set so that one is greater than the other and so that they will be rectangular when shown in FIG. 4A and FIG. 5A. In general, the filter processing should be changed by making a change that increases at least one of either the data numbers in the distance direction or the data numbers in the azimuth direction of the peripheral data corresponding to those that are closer than the data numbers in the distance direction and the data numbers in the azimuth direction of the peripheral data.

Also, in the above-described embodiment, a maximum value filter was explained as the digital filter 54; however, as described above, the digital filter 54 needs only to be an FIR filter having a characteristic in which, when there are values of data of interest that are less than or equal to a prescribed value, and if there are values that are larger than the prescribed value in the peripheral data in the periphery of the data of interest, they are converted to values that are larger than the prescribed value. Additionally, in this kind of FIR filter, the filter processing should be changed by making a change in which the range of the peripheral data that correspond to those that are closer in distance to the antenna 20 than a prescribed distance is increased when compared to the range of the peripheral data of the data of interest that correspond to those that are farther.

In this way, if there are data having larger values than a prescribed value in a large range, the data of interest that are close to the antenna will be changed to those that are larger than the prescribed value, so that the possibility that the prescribed value will become larger when compared to data of interest that are far from the antenna with a small range becomes higher. For this reason, if the sweep data are processed with this kind of FIR filter, the magnification factor of the objects that are closer than the objects that are far from the antenna can be increased.

Figure 7:
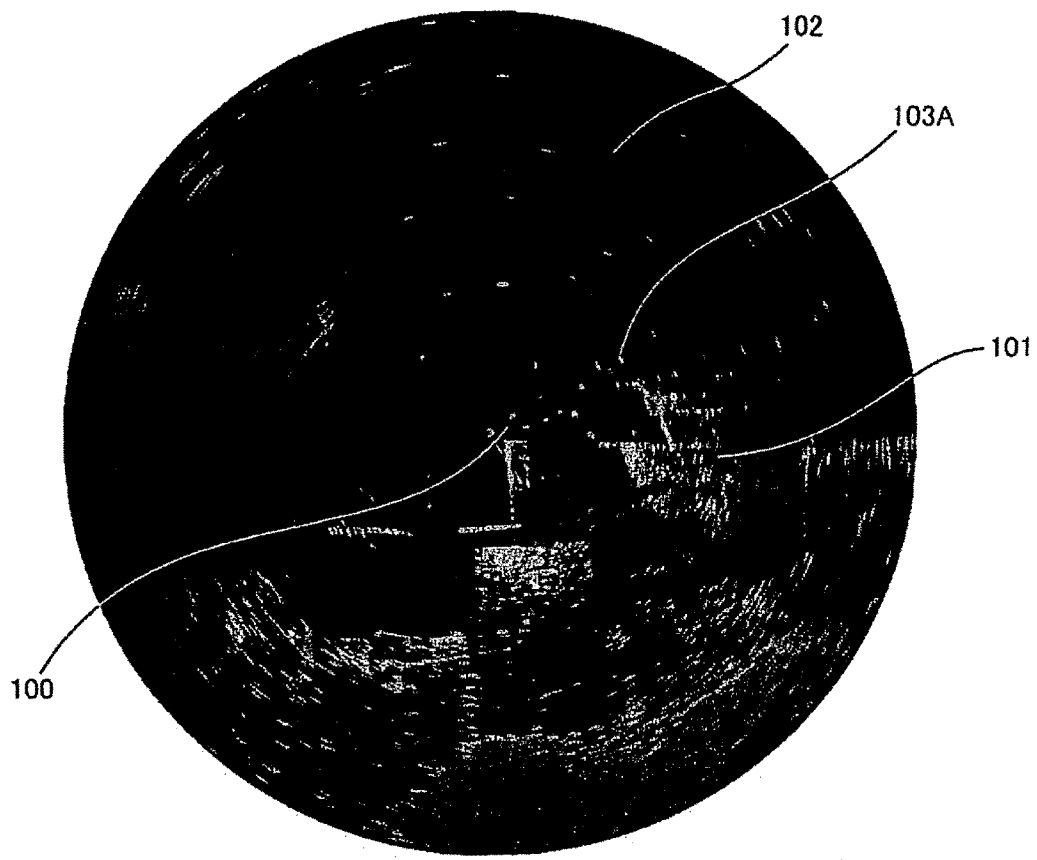
FIG. 7 is a diagram depicting the effects of the processing by the digital filter.

If the filter processing is conducted by the digital filter 54 while conducting the conversion of the filter processing shown in FIG. 6, the image of the display screen 61 shown in FIG. 3 will be converted to the image shown in FIG. 7. When comparing FIG. 7 with FIG. 3, the display of the boat 103A in FIG. 7 that is close to the center 100 can be seen to be larger than the display of the boat 103 in FIG. 3.

Second Embodiment

Figure 8:
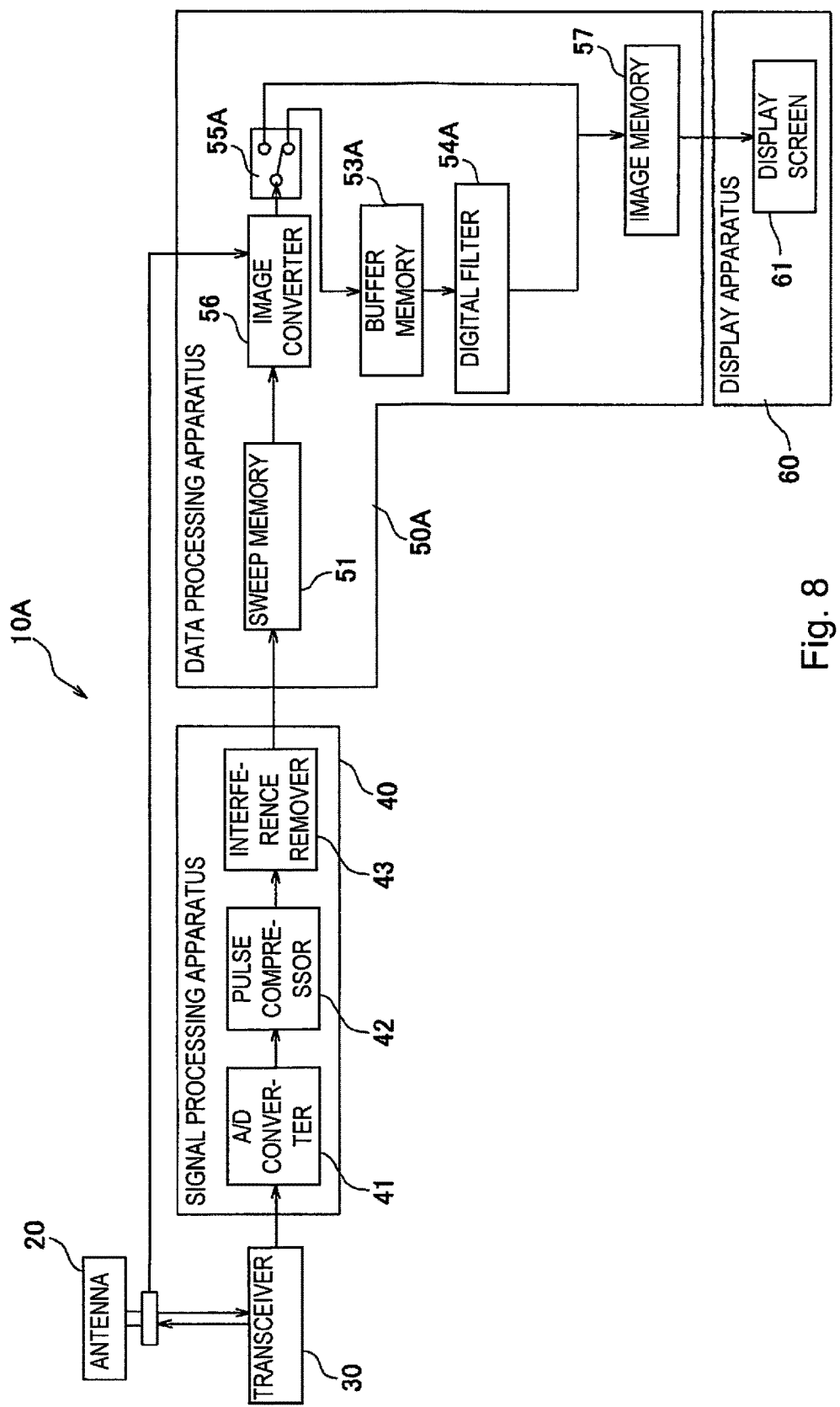
FIG. 8 is a block diagram showing a schematic configuration of the radar apparatus according to the second embodiment of the present invention.

Next, a radar apparatus according to the second embodiment of the present invention will be explained using FIG. 8. The radar apparatus 10A according to the second embodiment comprises an antenna 20, a transceiver 30, a signal processing apparatus 40, a data processing apparatus 50A, and a display apparatus 60 in the same way as the radar apparatus 10 according to the first embodiment.

The point in which the first embodiment and the second embodiment are different is in the difference in the configuration of the data processing apparatuses 50 and 50A. Since the configuration and the behavior of the antenna 20, the transceiver 30, the signal processing apparatus 40, and the display apparatus 60 are the same for the radar apparatus 10 of the first embodiment and the radar apparatus 10A of the second embodiment, the explanations for these have been omitted.

In the above-described first embodiment, a case is shown in which the digital filter 54 processes the sweep data, but the same processing can be carried out with respect to the image data that the image memory 57 stores. In this kind of case, a buffer memory 53A, a digital filter 54A, and a selector 55A that correspond to the buffer memory 53, the digital filter 54, and the selector 55 are provided in the data processing apparatus 50A. Additionally, the selector 55A is provided downstream of the image converter 56. When processing in the same way as the conventional way, the selector 55A switches the connection so that the output of the image converter 56 is output to the image memory 57.

When carrying out processing so that the objects that are close to the antenna 20 are displayed to be large, as explained for the first embodiment, the selector 55A switches the connection so that the output of the image converter 56 is output with respect to the buffer memory 53A.

The processing that is conducted in the buffer memory 53A and digital filter 54A is different in the point that the data to be processed are echo data that are converted from the R-θ coordinate system to the X-Y coordinate system; however, this processing is the same as the processing regarding the sweep data of the R-θ coordinate system conducted in the buffer memory 53 and the digital filter 54. In the digital filter 54A, for the sequence of data, the X-axis direction is used in place of the distance direction R, and the Y-axis direction is used in place of the azimuth direction θ. In a digital filter 54A that processes image data in an X-Y coordinate system that is arranged in a matrix in the X-axis direction and the Y-axis direction, the sizes of the windows W1 and W2 of the digital filter 54A are defined by the number of data in the X-axis direction in place of the number of data in the distance direction R; they are also defined by the number of data in the Y-axis direction in place of the number of data in the azimuth direction θ. In the digital filter 54A, the windows W1 and W2 move in the X-axis direction and the Y-axis direction; when the maximum value of the data in windows W1 and W2 is larger than the data values in the center of the windows W1 and W2, the data values in the center are replaced by the maximum values of the data in windows W1 and W2. In this way, the data processed by the digital filter 54A are stored in the image memory 57 sequentially.

Additionally, this embodiment is the same as the first embodiment in the point that the image data stored in the image memory 57 are displayed on the display screen 61. When a step that goes through the buffer memory 53A and the digital filter 54A is selected by the selector 55A, as was described using FIG. 4 and FIG. 5, the objects, etc., that are close to the antenna 20 are displayed enlarged.

Characteristics (1)

When enlarging the objects close to the antenna 20 is desired for easy visibility, the output of the image converter 56 is switched to go through the buffer memory 53A and the digital filter 54A by the selector 55A. Of the image data that are converted by the image converter 56 in relation to the distance and the azimuth with respect to the antenna 20, the buffer memory 53A (the memory of claim 1) stores those that are required for the processing of the digital filter 54A. The digital filter 54A changes the sizes of the windows W1 and W2 (the range of the peripheral data) according to the distance from the antenna 20. With this, the magnification factor of the display can be changed according to the distance from the antenna 20.

Meanwhile, in the explanation of the above-described second embodiment, an example in which the digital filter 54A is before the image memory 57 was given; however, the buffer memory 54A and the digital filter 54A can be provided after the image memory 57. For example, in the case that the digital filter 54A is provided immediately after the image memory 57, the image memory 57 will correspond to the memory of claim 1.

(2) The digital filter 54A also converts the data values in the center to the maximum data values in the windows W1 and W2 when the maximum values in the windows W1 and W2 are larger than the data values in the center of the windows W1 and W2. With this, the data in the centers of the windows W1 and W2 become large. As a result, the images close to the location of the antenna 20 are more easily enlarged, and the images far from the location of the antenna 20 become less easy to enlarge; also, the magnification factor for those that are closer to the location of the antenna 20 can be made larger when compared to those that are far away.

Modified Example 1

In the above-described first embodiment and second embodiment, a digital filter 54 that is a maximum value filter was used as the FIR filter. However, the FIR filter can be a filter besides a maximum value filter; for example, this filter can be a moving average filter that replaces the values of the data of interest with the average value of the peripheral data that are in the periphery of the data of interest.

A moving average filter is used in place of a digital filter 54 and is set so that the filter processing is changed by conducting a change that increases at least one of either the data numbers in the distance direction or the data numbers in the azimuth direction of the peripheral data corresponding to those that are closer in distance to the antenna 20 than a prescribed distance than the data numbers in the distance direction and the data numbers in the azimuth direction of the peripheral data of the data of interest that correspond to those that are farther.

Then, since the effects of the data close to the antenna with relatively large values will have a wider range as compared to those far from the antenna in the FIR filter, if the sweep data are processed with this kind of FIR filter, the magnification factor of the objects that are close to the antenna can be increased when compared to objects that are farther away.

Modified Example 2

In the above-described first embodiment and second embodiment, cases in which the windows W1 and W2 of the digital filter 54 are moved in the distance direction or the azimuth direction one by one were explained. However, the number of data to be moved is not limited to one and can be a plurality. However, when moving a plurality of numbers, operations such as complementing data that do not become the center with data in the periphery of those that do become the center are conducted.

For example, if moving in the distance direction by two, a step is conducted in which the average value of the data values of the centers before and after the data that do not become the center replaces the data of that which do not become the center.

Modified Example 3

In the above-described first embodiment and second embodiment, cases were explained in which windows W11-W16 of FIG. 6 were shown and the data numbers of the distance direction and the data numbers of the azimuth direction of the windows are the same, and the data numbers in the distance direction and the data numbers of the azimuth direction are changed at the same ratio according to the distance, such as 3×3, 5×5, 7×7, 9×9, 11×11, and 13×13.

Figure 9:
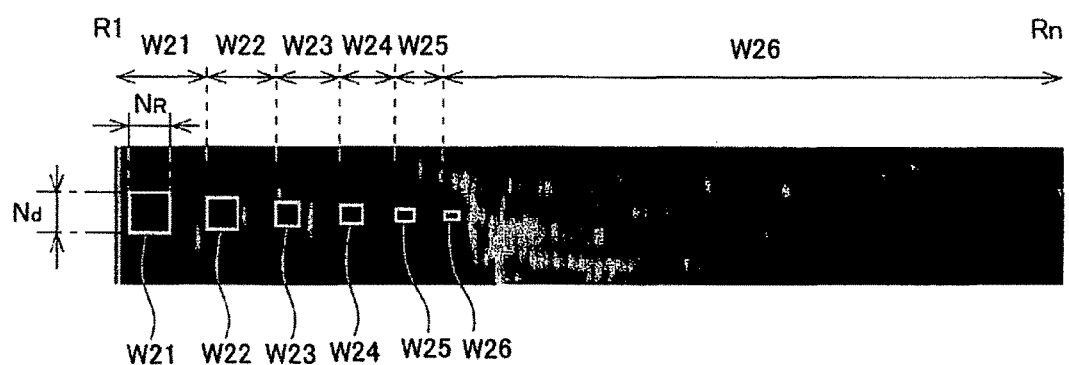
FIG. 9 is a conceptual diagram depicting another application method of a window of the digital filter.

However, the data numbers of the distance direction and the data numbers of the azimuth direction of the windows can be different. Additionally, when changing them according to the distance, as with the windows W21, W22, W23, W24, W25, and W26 shown in FIG. 9, they can be changed so that the ratio of the data numbers $N_R$ in the distance direction and the data numbers $N_d$ in the azimuth direction will change according to the distance from the antenna 20.

Also, the method of changing the data numbers can be configured so that, for example, the rate that the data numbers $N_d$ in the azimuth direction change according to the distance from the antenna 20 is smaller than the rate at which the data numbers $N_R$ in the distance direction change.

Modified Example 4

In the above-described windows W2, W2, W11-W16, and W21-W26, the data numbers in the distance direction and the data numbers in the azimuth direction were the same across the entirety; however, but the form of the windows is not limited to this. For example, the configuration can be such that the data numbers $N_R$ in the distance direction of the window will gradually increase and then gradually decrease following the increase in the azimuth, and the data numbers $N_d$ in the azimuth direction of the window can gradually increase and then gradually decrease following the increase in the distance. When a graph is used in which the vertical axis showing the data numbers in the distance direction and the horizontal axis showing the data numbers in the azimuth direction are the same size, in the case in which the data numbers in the distance direction are the same and the data numbers in the azimuth direction are the same across the entirety, the shape of the window will become rectangular on the above-described map. In a similar graph, if a window is drawn in which the data numbers $N_R$ in the distance direction gradually increase and then gradually decrease following the increase in the azimuth, and the data numbers $N_d$ in the azimuth direction of the window gradually increase and then gradually decrease following the increase in the distance, the shape of the window becomes, for example, a diamond-shape, a circular-shape, or an elliptical shape, depending on the way in which they gradually increase and then gradually decrease.

Modified Example 5

Next, a radar apparatus according to a fifth modified example will be explained. The radar apparatus according to the fifth modified example comprises an antenna 20, a transceiver 30, a signal processing apparatus 40, a data processing apparatus 50, and a display apparatus 60, in the same way as the radar apparatus 10 according to the first embodiment. The point in which the radar apparatus according to the fifth modified example is different from the radar apparatus 10 according to the first embodiment is the point in which the radar apparatus according to the fifth modified example uses an IIR (an infinite impulse response) filter in place of the digital filter 54, whereas the radar apparatus 10 according to the first embodiment uses an FIR filter as the digital filter 54.

With the digital filter 54, the state of the periphery that expands both in the distance direction and the azimuth direction with respect to the data of interest was taken into consideration; however, in the case of using an IIR filter, only the state of the periphery in the distance direction of the data of interest is taken into consideration, and the state of the periphery in the azimuth direction is not taken into consideration.

When using an IIR filter, for example, the relationship between the image data X(n) prior to the filter processing and the image data Y(n) after the filter processing can be expressed with the following formula using the image data Y(n−1) that is one before the image data Y(n).

$$Y(n)=(1-\alpha) \times X(n) + \alpha \times Y(n-1)$$

In the above formula, $\alpha$ is a constant, and the range is $0 \leq \alpha \leq 1$. In the case of this kind of filter, the value of the constant $\alpha$ is changed according to the distance. With this change in the constant $\alpha$, the filter coefficient is changed so that the pixel count of the data displayed on the display screen according to the digital signals after filtering will increase more for those that are closer to the antenna than for those that are farther away, as compared to the pixel count of the data displayed on the display screen according to the digital signals before filtering.

In the same way as the above-described embodiment, since the IIR filter changes the constant $\alpha$ (the filter coefficient) according to the distance from the antenna 20 so that the pixel count of the data displayed on the display screen 61 according to the sweep data after filtering will increase more for those that are closer to the antenna than those that are farther away, when compared to the pixel count of the data displayed on the display screen 61 according to the sweep data before filtering, the magnification factor of objects that are close to the antenna 20 can be increased when compared to the objects that are farther away.

Modified Example 6

In the above-described first embodiment and second embodiment, cases were explained in which, when the strength of the echo signal is strong (the amplitude of the echo signal is large), the value of the digital data becomes large. For this reason, cases were explained in which a digital filter processing is conducted so that, when enlarging the display of the objects close to the antenna 20 is desired, the maximum value of the data in the window is made to be the value of the data in the center. Also, a case was explained in which a digital filter processing is conducted so that, when the average value of the data in the window is larger than the value of the data in the center, the average value is made to the value of the data in the center.

For example, in the case that the setting is such that, when the strength of the echo signal is strong (the amplitude of the echo signal is large) the value of the digital data becomes small, enlarging the display of the objects close to the antenna 20 is desired, contrary to the above-described embodiment, a digital filter processing can be conducted so that, for example, the minimum value of the data in the window is made to be the value of the data in the center of the window. By doing the above, the larger the window, the greater the possibility that the value of the digital data becomes smaller (the strength of the echo signal is strengthened), so that the display area of the part with the strong echo signal can be enlarged.

Modified Example 7

In the above-described first embodiment and second embodiment, the digital filter 54 and the selector 55 of the data processing apparatus 50 are realized by, for example, an LSI, which is an integrated circuit. These can be made of a single chip individually, or they may be made into a single chip comprising some or all of them. Also, the method for circuit integration is not limited to LSI and can be realized with a dedicated circuit or a general-purpose processor. Additionally, an FPGA (Field Programmable Gate Array), which can be programmed after the LSI is manufactured, or a configurable processor, which can reconfigure the connections and the settings of the circuit cells inside of the LSI, can be utilized.

The data processing apparatus 50 can also be realized by a CPU conducting an interpretive execution of the program data that can execute the above-described procedures and that are stored in a storage apparatus (a ROM, a RAM, a hard disk, etc.). These program data can be introduced in the storage apparatus via a storage medium, or they can be directly executed from the storage medium. Meanwhile, storage medium here refers to a semiconductor memory, such as a ROM, a RAM, and a flash memory; a magnetic disc memory, such as flexible discs and hard disks; an optical disc memory, such as a CD-ROM, a DVD, a BD, etc.; and memory cards, etc. Additionally, a storage medium is a concept that includes communication media, such as telephone lines and conveying paths, etc.

The invention claimed is:

1. A radar apparatus comprising:
an antenna for transmission and reception configured to repeatedly emit transmission beams while changing azimuth of emission and to receive reflected echo from reflecting bodies;
an analog-to-digital converter configured to convert analog signal corresponding to echo signal received by the antenna to digital data;
a memory configured to store the digital data obtained through conversion in the analog-to-digital converter in association with distance from the antenna and azimuth for the antenna to rotate;
processing circuitry configured to convert a value of data of interest to be processed, of the digital data read from the memory, to a value based on values of the data of interest and peripheral data in a periphery along the distance direction of the data of interest; and
a display screen configured to show a display based on the digital data filtered by the processing circuitry,
the processing circuitry being further configured to change a range of the peripheral data used for a filter processing according to the distance from the antenna in association with the data of interest.

2. The radar apparatus according to claim 1, wherein the processing circuitry is further configured to convert the value of the data of interest to a value based on the values of the peripheral data when strength of the echo signal of the peripheral data is stronger than strength of the echo signal of the data of interest to increase the strength of the echo signal indicated by the data of interest.

3. The radar apparatus according to claim 2, wherein the processing circuitry is further configured to use the peripheral data that are in a wider range when the distance from the antenna to the position where the data of interest is obtained is closer than when the distance is farther away.

4. The radar apparatus according to claim 2, wherein the processing circuitry is configured such that a ratio of a number of data in a distance direction and a number of data in an azimuth direction, which set the range of the peripheral data, is made to differ according to the distance from the antenna to the position where the data of interest is obtained.

5. The radar apparatus according to claim 4, wherein the number of data in the azimuth direction has a smaller ratio of change according to the distance from the antenna to the position where the data of interest is obtained than that of the number of data in the distance direction.

6. The radar apparatus according to claim 2, wherein the processing circuitry defines the range of the peripheral data by a window, the window having the same number of data in the distance direction and the same number of data in an azimuth direction across the entirety.

7. The radar apparatus according to claim 2, wherein the processing circuitry defines the range of the peripheral data by a window, the number of data in the distance direction of the window gradually increasing and then gradually decreasing in accordance with an increase in the azimuth, the number of data in the azimuth direction of the window gradually increasing and then gradually decreasing in accordance with an increase in the distance.

8. The radar apparatus according to claim 1, wherein the processing circuitry is further configured to use the peripheral data that are in a wider range when the distance from the antenna to the position where the data of interest is obtained is closer than when the distance is farther away.

9. The radar apparatus according to claim 1, wherein the processing circuitry is configured such that a ratio of a number of data in the distance direction and a number of data in an azimuth direction, which set the range of the peripheral data, is made to differ according to the distance from the antenna to the position where the data of interest is obtained.

10. The radar apparatus according to claim 9, wherein the number of data in the azimuth direction has a smaller ratio of change according to the distance from the antenna to the position where the data of interest is obtained than that of the number of data in the distance direction.

11. The radar apparatus according to claim 1, wherein the processing circuitry defines the range of the peripheral data by a window, the window having the same number of data in the distance direction and the same number of data in an azimuth direction across the entirety.

12. The radar apparatus according to claim 1, wherein the processing circuitry defines the range of the peripheral data by a window, the number of data in the distance direction of the window gradually increasing and then gradually decreasing in accordance with an increase in an azimuth, the number of data in the azimuth direction of the window gradually increasing and then gradually decreasing in accordance with an increase in the distance.

13. The radar apparatus according to claim 1, wherein the memory is a memory that is configured to store the echo signal obtained through a plurality of consecutive transmissions and receptions as the digital data in an R-Θ coordinate system.

14. The radar apparatus according to claim 1, wherein the processing circuitry includes a converter that is configured to convert the echo signal obtained in an R-Θ coordinate system to an X-Y coordinate system, and is configured to store the echo signal as the image data in the X-Y coordinate system.

15. The radar apparatus according to claim 1, wherein the processing circuitry includes an FIR filter that is configured to convert the value of the data of interest to a maximum value of the data of interest and the peripheral data.

16. The radar apparatus according to claim 1, wherein the processing circuitry includes an FIR filter that is configured to convert the value of the data of interest to an average value of the data of interest and the peripheral data.

17. A data processing method comprising:
repeatedly emitting transmission beams from an antenna while changing azimuth of emission of the antenna and receiving at the antenna reflected echo from reflecting bodies;
generating digital data based on an echo signal received via the antenna;
storing in a memory the digital data in association with distance from the antenna and azimuth for the antenna to rotate;
conducting, by processing circuitry, a digital filter processing that converts a value of data of interest to be processed, of the digital data read from the memory, to a value based on values of the data of interest and peripheral data in a periphery along a distance direction of the data of interest;

changing, by the processing circuitry, a range of the peripheral data used for the digital filter processing according to the distance from the antenna in association with the data of interest;

generating image data, indicating a situation in a periphery of the antenna, for display on a display screen based on the digital data after conducting the digital filter processing and changing the range of the peripheral data used for the digital filter processing; and displaying the image data on the display screen.

18. The data processing method according to claim 17, wherein the digital filter processing includes a process in which the value of the data of interest is converted to a value based on the values of the peripheral data when strength of the echo signal indicated by the peripheral data is stronger than strength of the echo signal indicated by the data of interest to increase the strength of the echo signal indicated by the data of interest.

* * * * *